UNITED STATES PATENT OFFICE.

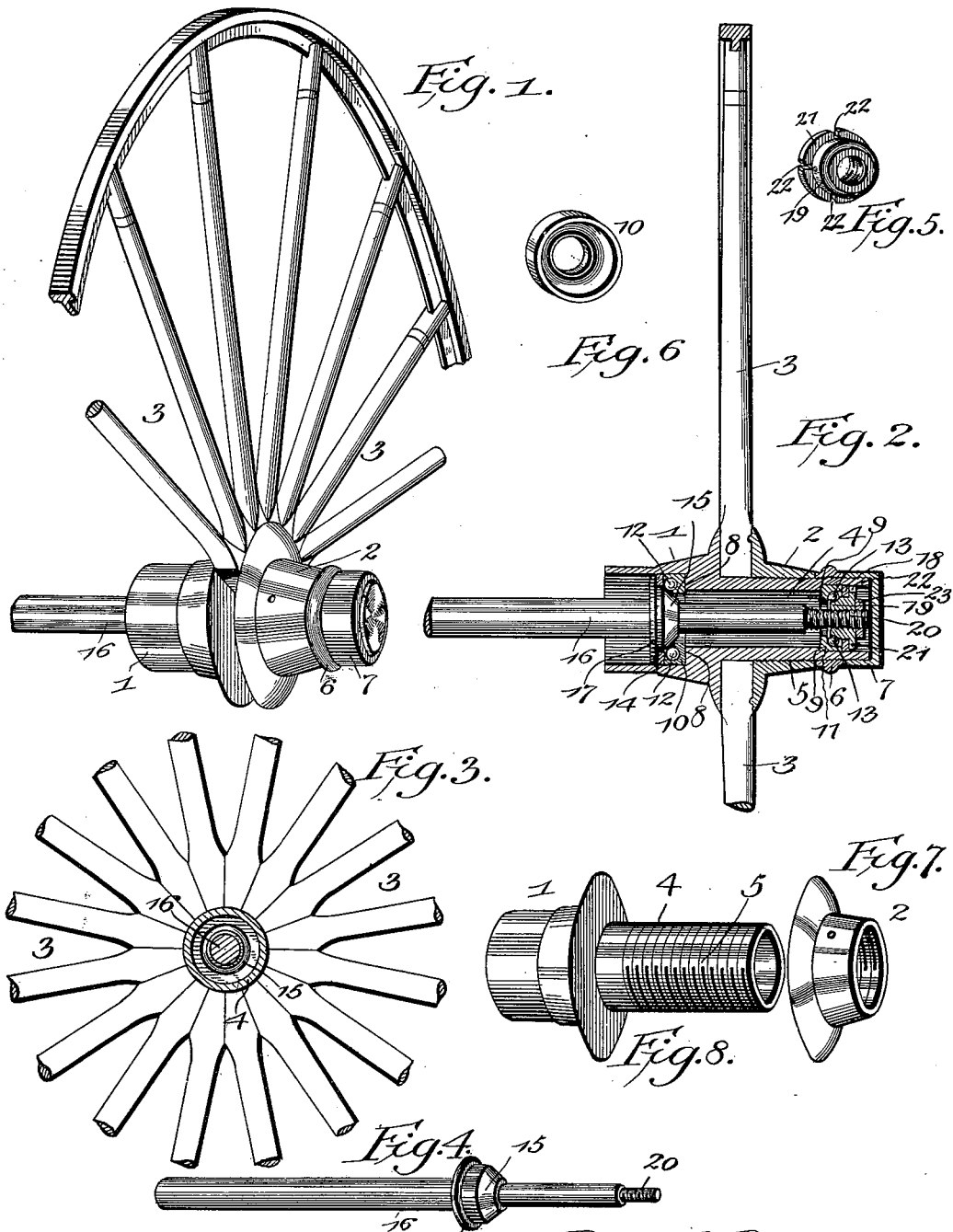

ROBERT L. BRETH, OF LA JOSE, PENNSYLVANIA, ASSIGNOR OF ONE-HALF TO JAMES GILLESPIE, OF PATTON, PENNSYLVANIA.

VEHICLE-WHEEL.

SPECIFICATION forming part of Letters Patent No. 635,228, dated October 17, 1899.

Application filed January 26, 1899. Serial No. 703,478. (No model.)

*To all whom it may concern:*

Be it known that I, ROBERT L. BRETH, a citizen of the United States, residing at La Jose, in the county of Clearfield and State of Pennsylvania, have invented a new and useful Vehicle-Wheel, of which the following is a specification.

The invention relates to improvements in vehicle-wheels.

The object of the present invention is to improve the construction of vehicle-wheels, and more especially to provide a ball-bearing one which will be simple and comparatively inexpensive in construction and which will be dust-proof and reduce the friction to a minimum.

The invention consists in the construction and novel combination and arrangement of parts hereinafter fully described, illustrated in the accompanying drawings, and pointed out in the claims hereto appended.

In the drawings, Figure 1 is a perspective view of a portion of a wheel provided with a ball-bearing hub constructed in accordance with this invention. Fig. 2 is a sectional view taken longitudinally of the hub. Fig. 3 is a similar view taken transversely of the hub and showing the inner portions of the spokes in elevation. Fig. 4 is a detail perspective view of the spindle. Fig. 5 is a detail perspective view of the outer bearing-cone. Fig. 6 is a detail perspective view of the inner ball-cup. Figs. 7 and 8 are detail views of the sections of the hub.

Like numerals of reference designate corresponding parts in all the figures of the drawings.

1 2 designate inner and outer hub-sections detachably connected together and adapted to clamp the inner ends of spokes 3 between them, and the inner section 1 is provided with an integral axle-box 4, which is exteriorly threaded at 5 to receive the interiorly-threaded hub-section 2. The hub-section 2 is provided with a suitable recess or socket and is adapted to be engaged by a spanner or other tool for screwing it on and off the axle-box. The axle-box extends beyond the outer section 2 and receives a threaded collar 6 and a threaded cap 7. The collar 6 serves as a jam-nut to prevent the outer section 2 from accidentally unscrewing, and the interiorly-threaded cap closes the outer end of the hub and renders the same dust-proof.

The inner and outer ends of the bore or axle-box of the hub are interiorly recessed to provide inner and outer shoulders 8 and 9, against which are seated inner and outer ball-cups 10 and 11, arranged within the recesses of the hub and provided with grooves forming races for inner and outer balls 12 and 13. The inner annular series of balls 12, which are of greater diameter than the outer balls 13, are retained within the ball-race of the cup 10 by a ring or washer 14 and bear against an inner cone-bearing 15 of an axle 16. The inner cone-bearing 15 extends through the opening of the retaining-ring 14 and is provided with an annular flange 17, engaging the outer face of the same.

The outer ball-cup 11 is similar in construction to the inner ball-cup 10, with the exception that it is of less diameter than the same, and the outer balls 13 are retained in the cup 11 by an outer ring or washer 18, through the opening of which extends an outer cone-bearing 19. The outer cone-bearing 19, which is interiorly threaded to engage the outer threaded end 20 of the spindle, is provided with an annular flange 21, engaging the retaining-ring and provided with peripheral recesses 22, adapted to receive a suitable tool for screwing the cone-bearing on and off the axle. The outer bearing-cone is locked against accidental unscrewing by a jam-nut 23 engaging the threaded end 20 of the spindle, as clearly shown in Fig. 2 of the accompanying drawings, and access may be readily had to the nut and the outer threaded bearing-cone by removing the cap. When the cap, nut, and outer bearing-cone are removed, the wheel may be taken off the axle and the balls will remain in the races.

The invention has the following advantages: The ball-bearing hub is simple and comparatively inexpensive in construction, it is strong and durable, and it effectually excludes dust from the inner and outer ball-bearings. It reduces friction to a minimum, and it enables access to be readily had to the balls. The wheel may be removed similar to an ordinary wheel, and there is no liability of the balls leaving the races and becoming lost.

Changes in the form, proportion, and minor details of construction may be made without departing from the spirit and scope or sacrificing any of the advantages of the invention.

What I claim is—

1. A device of the class described comprising a hub provided with inner and outer interior shoulders, inner and outer ball-cups seated against said shoulders, balls arranged within the cups, retaining-rings fitting within the hub and against the cups, an axle provided with an inner fixed bearing-cone extending through the inner retaining-ring and receiving the inner balls, and an outer cone-bearing interiorly threaded to engage the axle and extending through the outer retaining-ring, said bearing-cones being provided with annular flanges engaging the outer faces of the retaining-rings and holding the same in position, substantially as described.

2. In a device of the class described the combination with a hub, and an axle, of a ball-cup arranged within the hub, a series of balls therein, a retaining-ring fitting against the cup, and a removable bearing-cone interiorly threaded to engage the axle and extending through the retaining-ring, said bearing-cone being provided with a flange fitting against the retaining-ring and holding the same in position, substantially as described.

In testimony that I claim the foregoing as my own I have hereto affixed my signature in the presence of two witnesses.

ROBERT L. BRETH.

Witnesses:
ELMER E. SCOTT,
JEF GESTLE.